(12) United States Patent
Kaneichi et al.

(10) Patent No.: US 11,188,994 B2
(45) Date of Patent: Nov. 30, 2021

(54) DISPLAY CONTROL METHOD, DISPLAY CONTROL DEVICE, NON-TRANSITORY RECORDING MEDIUM STORING DISPLAY CONTROL PROGRAM, AND DISPLAY CONTROL SYSTEM FOR DISPLAYING FORECASTED DEMAND FOR A VEHICLE DISPATCH

(71) Applicants: TOYOTA JIDOSHA KABUSHIKI KAISHA, Toyota (JP); JapanTaxi Co., Ltd., Chiyoda-ku (JP)

(72) Inventors: Daiki Kaneichi, Nissin (JP); Yuichi Komatsu, Yokohama (JP); Kiichi Ueta, Bunkyo-ku (JP)

(73) Assignees: TOYOTA JIDOSHA KABUSHIKI KAISHA, Toyota (JP); JapanTaxi Co., Ltd., Chiyoda-ku (JP)

( * ) Notice: Subject to any disclaimer, the term of this patent is extended or adjusted under 35 U.S.C. 154(b) by 0 days.

(21) Appl. No.: 16/600,711

(22) Filed: Oct. 14, 2019

(65) Prior Publication Data

US 2020/0134766 A1    Apr. 30, 2020

(30) Foreign Application Priority Data

Oct. 31, 2018    (JP) .............................. JP2018-204815

(51) Int. Cl.
*G06Q 50/30*    (2012.01)
*G06F 3/14*    (2006.01)
*G06Q 10/06*    (2012.01)
*G06Q 30/02*    (2012.01)
*G06F 3/0481*    (2013.01)

(52) U.S. Cl.
CPC ............... *G06Q 50/30* (2013.01); *G06F 3/14* (2013.01); *G06Q 10/06315* (2013.01); *G06Q 30/0205* (2013.01); *G06F 3/04817* (2013.01)

(58) Field of Classification Search
CPC ....... G06Q 50/30–32; G06Q 10/06315; G06Q 30/0205; G06Q 10/04; G06Q 50/10; G06F 3/14; G06F 3/04817; G06F 16/29; G06F 16/9537; G09B 29/007
See application file for complete search history.

(56) References Cited

U.S. PATENT DOCUMENTS 6,701,300 B1 *    3/2004   Murakami ....... G06Q 10/06315
                                                   705/7.25
7,702,570 B2 *    4/2010   Noviello ................ G06Q 40/04
                                                   705/37

(Continued)

FOREIGN PATENT DOCUMENTS

JP    2006-162323 A    6/2006
JP    2009-009282 A    1/2009
KR    10-1490363 B1    2/2015

*Primary Examiner* — Phong X Nguyen
(74) *Attorney, Agent, or Firm* — Oblon, McClelland, Maier & Neustadt, L.L.P.

(57) ABSTRACT

A display control method includes causing a display control device to perform: a step (a) forecasting a demand for a vehicle dispatch at an arbitrary point or in an arbitrary area at a time specified by a host vehicle; and a step (b) superimposing, at a position on a map screen, information about the forecasted demand, the position corresponding to the arbitrary point or the arbitrary area.

4 Claims, 5 Drawing Sheets

(56) References Cited

U.S. PATENT DOCUMENTS

| | | | | |
|---|---|---|---|---|
| 8,315,905 B1* | 11/2012 | Adair | ................ | G06Q 30/0266 |
| | | | | 705/14.63 |
| 10,474,978 B2* | 11/2019 | Bangali | ............ | G06Q 10/06393 |
| 10,572,964 B2* | 2/2020 | Kim | ....................... | G06Q 50/30 |
| 10,672,114 B1* | 6/2020 | Gorlin | ................ | G06K 9/6215 |
| 2012/0265580 A1* | 10/2012 | Kobayashi | ............. | G06Q 30/02 |
| | | | | 705/7.31 |
| 2013/0144831 A1* | 6/2013 | Atlas | .................... | G06Q 10/06 |
| | | | | 706/50 |
| 2014/0330513 A1* | 11/2014 | Fratti | .................. | G01C 21/367 |
| | | | | 701/455 |
| 2015/0039391 A1* | 2/2015 | Hershkovitz | .......... | G06Q 50/30 |
| | | | | 705/7.31 |
| 2016/0364669 A1* | 12/2016 | Wang | .............. | G06Q 10/06315 |
| 2018/0308366 A1* | 10/2018 | Goel | .................... | G08G 5/0043 |
| 2018/0330621 A1* | 11/2018 | Kuncl | .................. | G08G 1/205 |
| 2019/0019407 A1* | 1/2019 | Nakhjavani | ........ | G06K 9/00812 |
| 2019/0196512 A1* | 6/2019 | Blake | .................. | G06Q 10/083 |
| 2019/0197798 A1* | 6/2019 | Abari | .................... | G06Q 10/02 |
| 2019/0266625 A1* | 8/2019 | Kikuchi | ............. | G06Q 30/0205 |
| 2019/0295014 A1* | 9/2019 | Fagnant | ................ | G06Q 10/02 |
| 2020/0160709 A1* | 5/2020 | Ramot | ............ | B60W 60/00253 |

* cited by examiner

DISPLAY CONTROL METHOD, DISPLAY CONTROL DEVICE, NON-TRANSITORY RECORDING MEDIUM STORING DISPLAY CONTROL PROGRAM, AND DISPLAY CONTROL SYSTEM FOR DISPLAYING FORECASTED DEMAND FOR A VEHICLE DISPATCH

INCORPORATION BY REFERENCE

The disclosure of Japanese Patent Application No. 2018-204815 filed on Oct. 31, 2018 including the specification, drawings and abstract is incorporated herein by reference in its entirety.

BACKGROUND

1. Technical Field

The present disclosure relates to a display control method, a display control device, a non-transitory recording medium storing a display control program, and a display control system.

2. Description of Related Art

Japanese Patent Application Publication No. 2009-9282 (JP 2009-9282 A) describes a technique for displaying demand forecast information on taxi dispatch in a mesh format that is set in advance.

SUMMARY

In the technique described in Japanese Patent Application Publication No. 2009-9282 (JP 2009-9282 A), the same time axis is used for all the elements of the displayed mesh and, therefore, the demand forecast information that takes into account the traveling time and the distance from the host vehicle's position to an arbitrary point cannot be displayed. For example, even for a position 100 m ahead of the host vehicle's position, the demand forecast information corresponding to the time that is 30 minutes ahead from the current time is displayed.

The present disclosure provides a display control method, a display control device, a non-transitory recording medium storing a display control program, and a display control system all of which can display demand forecast information that takes into account the traveling time and the distance from the host vehicle's position to an arbitrary point.

A first aspect of the disclosure provides a display control method. The display control method includes causing a display control device to perform: a step (a) forecasting a demand for a vehicle dispatch at an arbitrary point or in an arbitrary area at a time specified by a host vehicle; and a step (b) superimposing, at a position on a map screen, information about the forecasted demand, the position corresponding to the arbitrary point or the arbitrary area.

In the first aspect, the time may be a time at which the host vehicle will arrive at the arbitrary point or in the arbitrary area from a current position of the host vehicle.

In the first aspect, the arbitrary area may be an area included in one of concentric circles centered at the current position of the host vehicle.

In the first aspect, the step (a) may further include calculating first demand forecast information based on a size of a radius of a first concentric circle included in the concentric circles and calculating second demand forecast information based on a size of a radius of a second concentric circle included in the concentric circles, and the step (b) may further include superimposing, on the map screen, the first demand forecast information in a range of a first display area corresponding to the first concentric circle and superimposing, on the map screen, the second demand forecast information in a range of a second display area corresponding to the second concentric circle excluding the range of the first display area.

A second aspect of the disclosure provides a display control device. The display control device includes a memory and a processor with hardware, the processor being configured to forecast a demand for a vehicle dispatch at an arbitrary point or in an arbitrary area at a time specified by a host vehicle, and superimpose, at a position on a map screen, information about the forecasted demand, the position corresponding to the arbitrary point or the arbitrary area.

A third aspect of the disclosure provides a non-transitory recording medium storing a display control program, the display control program being configured to cause a display control device to perform a method including: a step (a) forecasting a demand for a vehicle dispatch at an arbitrary point or in an arbitrary area at a time specified by a host vehicle; and a step (b) superimposing, at a position on a map screen, information about the forecasted demand, the position corresponding to the arbitrary point or the arbitrary area.

A fourth aspect of the disclosure provides a display control system. The display control system includes a processor configured to receive a specification of an arbitrary point from an occupant of a vehicle acquire position information including a current position of the vehicle, calculate a distance and a traveling time from the current position of the vehicle to the arbitrary point based on the position information, send a sending request signal to a server outside the vehicle via a communication network, the sending request signal requesting the server to send demand forecast information on an area within a predetermined-distance range including the current position of the vehicle and the arbitrary point, receive, from the server, the demand forecast information for a period up to a predetermined time from a current time, and extract, based on the calculated traveling time, a specific demand forecast information on the arbitrary point; and a display configured to superimpose, on a map screen, the specific demand forecast information on the arbitrary point.

In the fourth aspect, the processor may be configured to set a first concentric circle and a second concentric circle both of which are centered at the current position of the vehicle, calculate first demand forecast information based on a size of a radius of the first concentric circle, and calculate second demand forecast information based on a size of a radius of the second concentric circle, and the display may be configured to superimpose, on the map screen, the first demand forecast information in a range of a first display area corresponding to the first concentric circle, and superimpose, on the map screen, the second demand forecast information in a range of a second display area corresponding to the second concentric circle excluding the range of the first display area.

According to the display control method, display control device, non-transitory recording medium storing the display control program, and display control system in the present disclosure, the demand forecast information that takes into account the traveling time and the distance from the host vehicle's position to an arbitrary point can be displayed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A vehicle dispatch system in an embodiment will be described below with reference to the drawings.

[Configuration]

Figure 1:
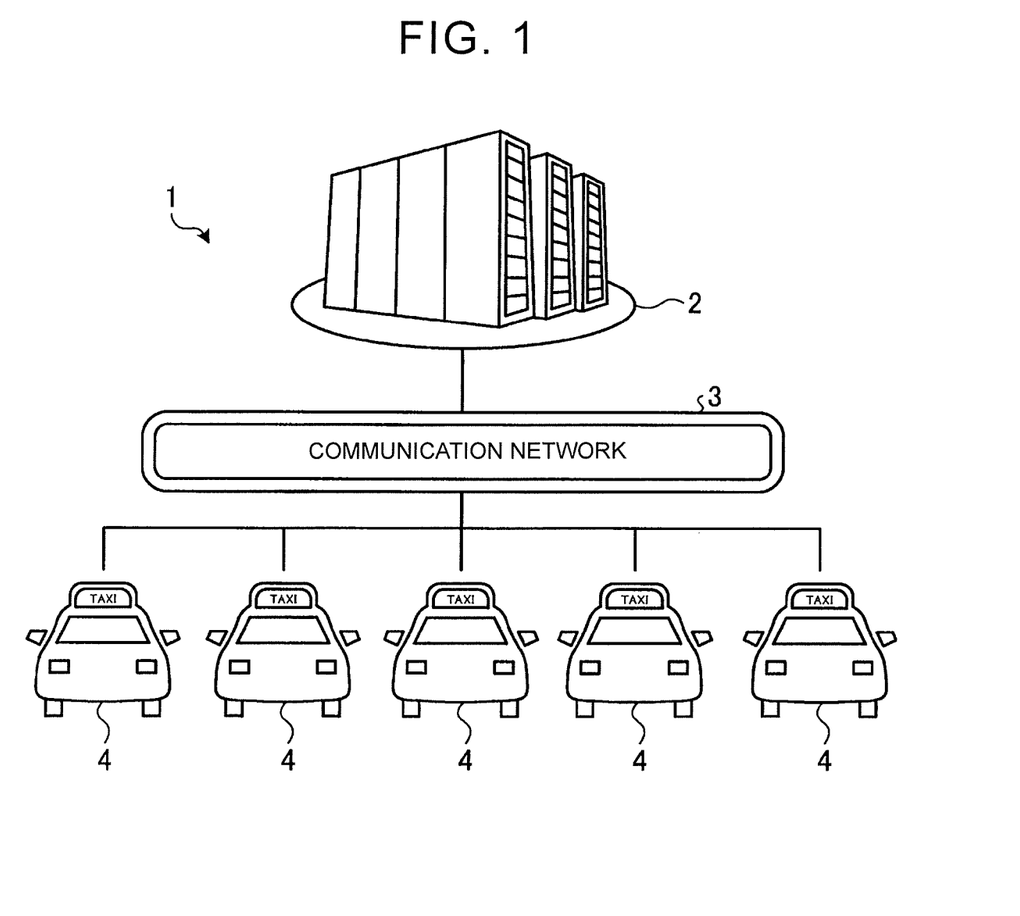
FIG. 1 is a schematic diagram showing a configuration of a vehicle dispatch system in an embodiment.
Figure 2:
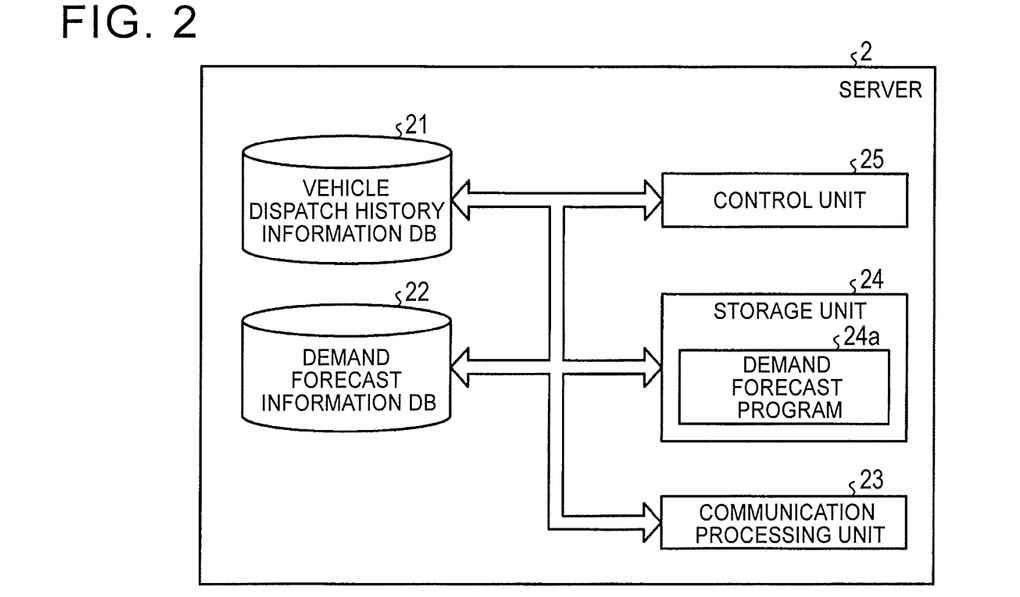
FIG. 2 is a block diagram showing a configuration of the server shown in FIG. 1.
Figure 3:
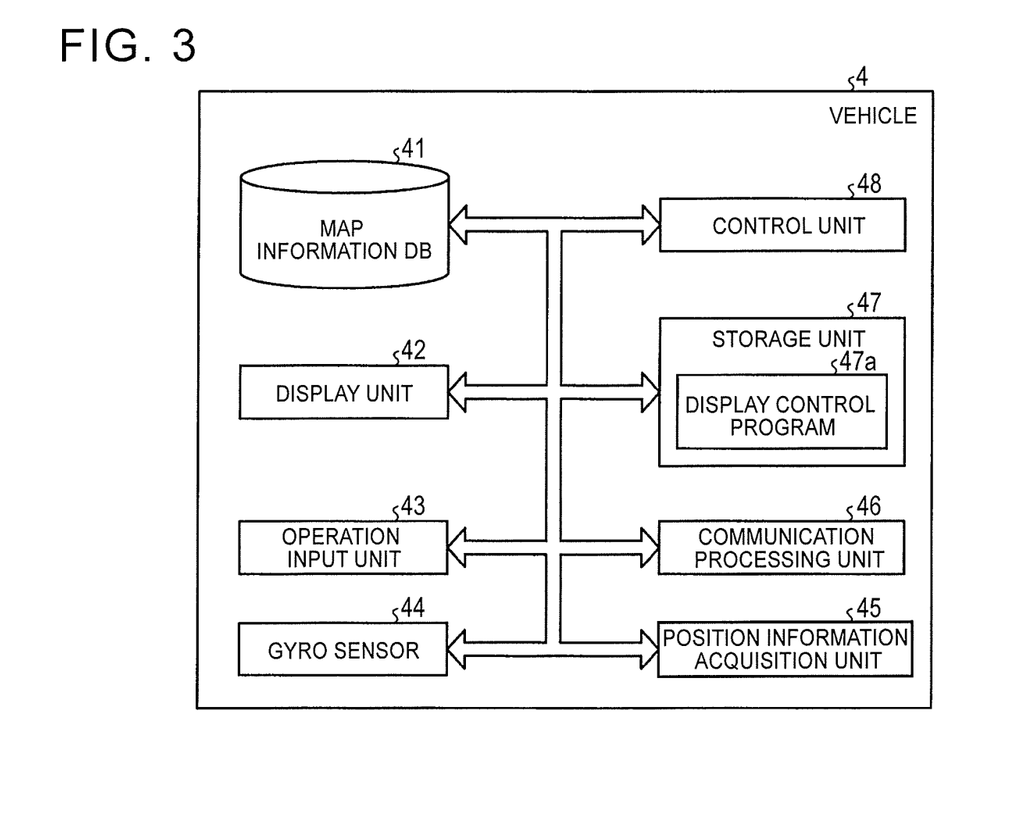
FIG. 3 is a block diagram showing a configuration of the vehicle shown in FIG. 1.

First, a configuration of a vehicle dispatch system in the embodiment will be described with reference to FIG. 1 to FIG. 3. FIG. 1 is a block diagram showing a configuration of the vehicle dispatch system in the embodiment. FIG. 2 is a block diagram showing a configuration of a server 2 shown in FIG. 1. FIG. 3 is a block diagram showing a configuration of a vehicle 4 shown in FIG. 1.

As shown in FIG. 1, a vehicle dispatch system 1 in the embodiment is an information processing system. This information processing system provides the drivers of vehicles with the information on the dispatch demand forecast of vehicles, such as taxis (hereinafter referred to as demand forecast information), so that the vehicles can be efficiently dispatched. The vehicle dispatch system 1 includes the server 2 and a plurality of vehicles 4 as its main components. The plurality of vehicles 4 are connected to the server 2 via a communication network 3 such as the Internet or a cellular phone network.

As shown in FIG. 2, the server 2 includes a vehicle dispatch history information database (vehicle dispatch history information DB) 21, a demand forecast information database (demand forecast information DB) 22, a communication processing unit 23, a storage unit 24, and a control unit 25. The server 2 may be configured by a plurality of computers or may be a cloud server.

The vehicle dispatch history information DB 21 stores the vehicle dispatch history information. This vehicle dispatch history information includes the information such as the information on a location where, and a time when, a dispatch request for the vehicle 4 was made (for example, latitude/longitude information, mesh information, information on administrative divisions (blocks) such as a town name and an address).

The demand forecast information DB 22 stores demand forecast information generated by the control unit 25 in a form readable via the communication network 3.

The communication processing unit 23 is configured by a local area network (LAN) interface board, a wireless communication circuit for wireless communication, and the like. The communication processing unit 23 controls the processing of information communication with the vehicles 4 via the communication network 3.

The storage unit 24 is configured by recording media permanently installed in the computer and recording media removable from the computer. The recording media permanently installed in the computer include an erasable programmable ROM (EPROM) and a hard disk drive (HDD). The recording media removable from the computer include a universal serial bus (USB) memory, a flexible disk, a magneto-optical disk, a compact disc read only memory (CD-ROM), a compact disc rewritable (CD-RW), a digital versatile disc (DVD), a Blu-ray (registered trademark) disc (BD), a digital audio tape (DAT), an 8-mm tape, and a memory card. A solid state drive (SSD) can be used as a recording medium removable from the computer or as a recording medium permanently installed in the computer.

The storage unit 24 stores the operating system, various computer programs, various tables, and various databases. In this embodiment, the storage unit 24 stores a demand forecast program 24a, which is a computer program describing a routine for generating demand forecast information, and data such as various types of setting information (not shown) used for generating demand forecast information. The demand forecasting program 24a may also be provided in a form downloadable via the communication network 3.

The control unit 25 includes a processor, such as a central processing unit (CPU), a digital signal processor (DSP), or a field-programmable gate array (FPGA), and a memory (main storage unit) including a random access memory (RAM) and a read only memory (ROM) (none shown). The control unit 25 loads a computer program, stored in the storage unit 24, into the work area of the main storage for execution. Through the execution of the computer program, the control unit 25 controls the components to implement the function that meets the intended purpose. In this embodiment, the control unit 25 executes the demand forecast program 24a to generate the demand forecast information for the period from the current time up to a predetermined time, based on the vehicle dispatch history information stored in the vehicle dispatch history information DB 21. The control unit 25 may also generate the demand forecast information for the period from the current time up to a predetermined time, using the information other than the vehicle dispatch history information such as the information on the weather and events. The control unit 25 stores the generated demand forecast information in the demand forecast information DB 22.

As shown in FIG. 3, the vehicle 4 includes a map information database (map information DB) 41, a display unit 42, an operation input unit 43, a gyro sensor 44, a position information acquisition unit 45, a communication processing unit 46, a storage unit 47, and a control unit 48.

The map information DB 41 stores map information. The map information includes the information on the locations and shapes of roads (for example, the number of lanes on a road, types of lanes such as a passing lane and a driving lane), location information on intersections and diverging points, information on rivers, waterways, railway tracks, and information on administrative divisions such as town names and street addresses. The vehicle 4 may also be configured to acquire and use necessary map information via the communication network 3.

The display unit 42, configured by a display device such as a liquid crystal display device or an organic electroluminescence (EL) display device, visually displays various types of information in response to a display control signal from the control unit 48. Various types of information, though visibly displayed in this embodiment, may be output as a voice message.

The operation input unit 43 is configured by an operation input device such as a keyboard, a touch panel, a switch, or a microphone. In response to an operation by the driver of the vehicle 4, the operation input unit 43 outputs the operation input signal, which indicates the operation content of the driver, to the control unit 48.

The gyro sensor 44 acquires the information on the direction of the vehicle 4 and outputs the signal, which indicates the acquired direction of the vehicle 4, to the control unit 48.

The position information acquisition unit 45 receives GPS signals to measure the position of the vehicle 4 based on the received GPS signals. The GPS signals are the signals delivered from three or more global positioning system (GPS) satellites each of which circles the Earth in an orbit. The position information acquisition unit 45 outputs the electrical signal, which indicates the position information on the vehicle 4 which has been positioned, to the control unit 48.

The communication processing unit 46 is configured by a wireless communication circuit and the like for wireless communication. The communication processing unit 46 controls the processing of information communication with the server 2 via the communication network 3.

The storage unit 47 is configured in the same way as the storage unit 24 of the server 2. The storage unit 47 stores the operating system, various computer programs, various tables, various databases, and the like. In this embodiment, the storage unit 47 stores a display control program 47a, which is a computer program describing a routine for controlling the display of various types of information on the display unit 42, and data such as various types of setting information (not shown) for controlling the display of various types of information on the display unit 42. The display control program 47a may also be provided in a form downloadable via the communication network 3.

The control unit 48 is configured in the same way as the control unit 25 of the server 2. The control unit 48 loads a computer program, stored in the storage unit 47, into the work area of the main storage unit for execution. Through the execution of the computer program, the control unit 48 controls the components to implement the function that meets the intended purpose.

In the vehicle dispatch system 1 having the configuration described above, the control unit 48 of the vehicle 4 executes the display control processing described below to display the demand forecast information that takes into account the traveling time and distance from the host vehicle's position to an arbitrary point. The operation of the control unit 48 that is performed when executing the display control processing will be described below with reference to FIG. 4 to FIG. 6.

[Display Control Processing]

Figure 4:
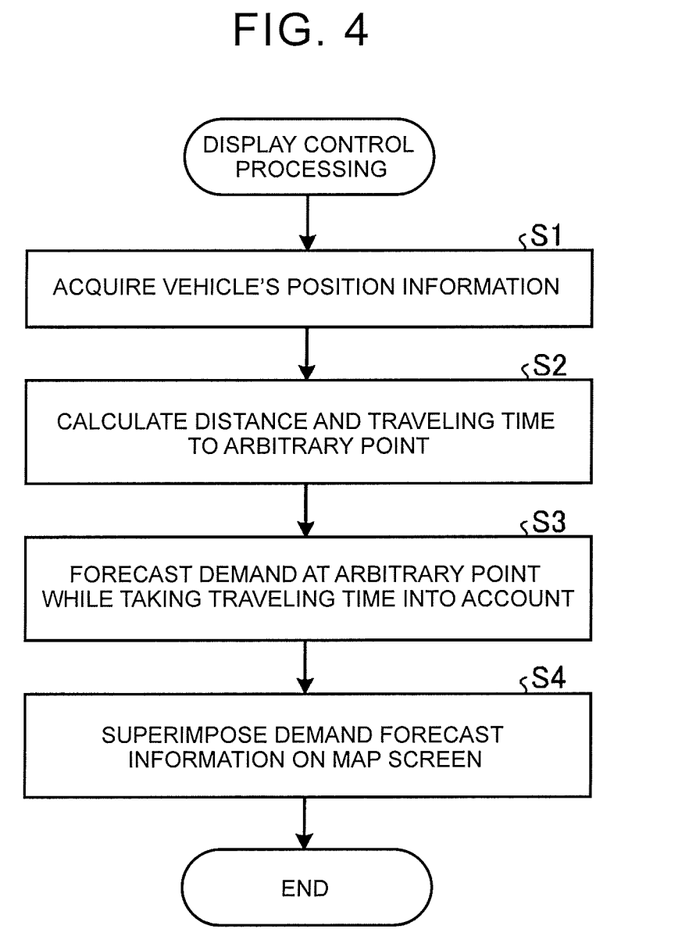
FIG. 4 is a flowchart showing a flow of display control processing in the embodiment.
Figure 5:
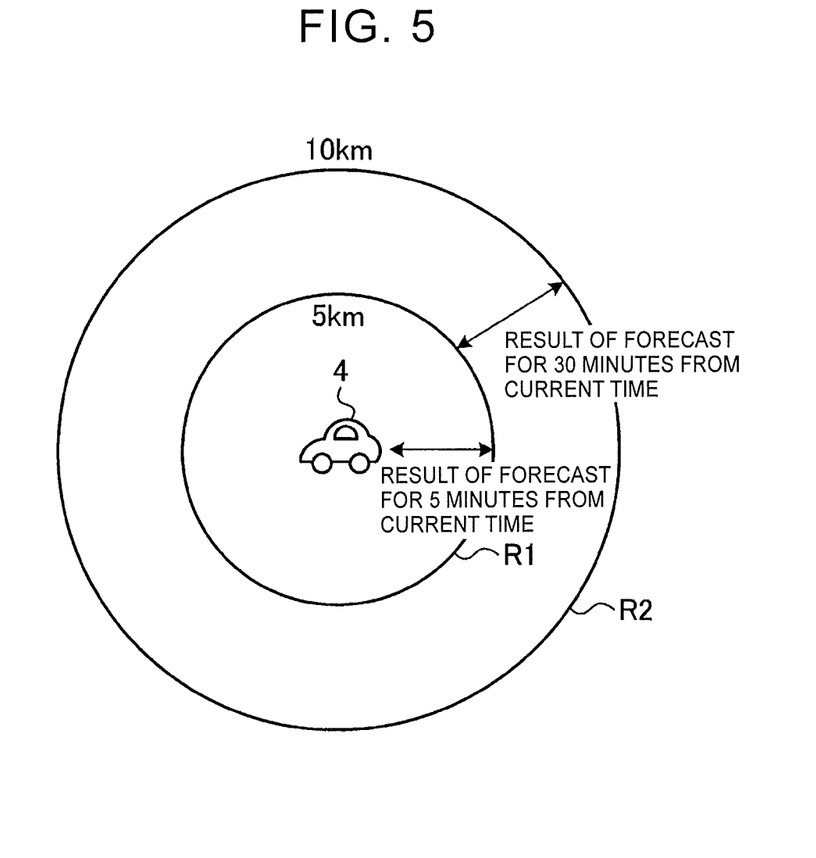
FIG. 5 is a diagram showing an example of the display of demand forecast information.
Figure 6:
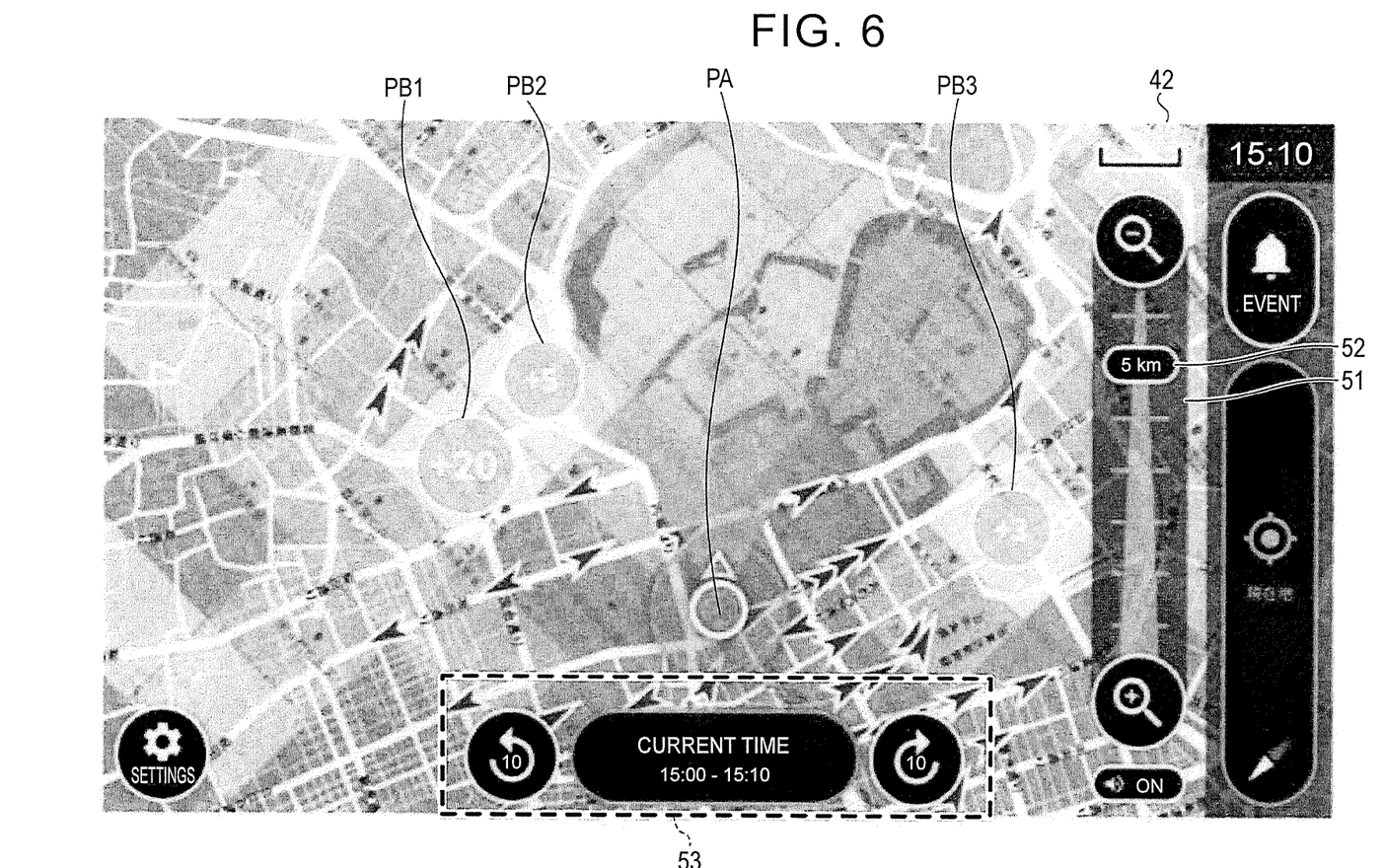
FIG. 6 is a diagram showing another example of the display of demand forecast information.

FIG. 4 is a flowchart showing the flow of display control processing in the embodiment. FIG. 5 and FIG. 6 are diagrams showing examples in which demand forecast information is displayed.

The processing of the flowchart shown in FIG. 4 is started when the driver of the vehicle 4 performs an operation on the operation input unit 43 to instruct the display unit 42 to display the demand forecast information. When the driver performs such an input operation, the display control processing proceeds to step S1. The display control processing is repeatedly performed at predetermined periodic control intervals until an instruction to end the display control processing is received. The function of the control unit 48 described below is implemented when the control unit 48 executes the display control program 47a.

In the processing in step S1, the control unit 48 uses the position information acquisition unit 45 to acquire the host vehicle's position information. After the host vehicle's position information is acquired, the processing in step S1 is completed and the display control processing proceeds to step S2.

In the processing in step S2, the control unit 48 calculates the distance and the traveling time from the host vehicle's current position to an arbitrary point based on the position information acquired in the processing in step S1. An arbitrary point is, for example, a point specified by the driver via the operation input unit 43 or a point within a predetermined distance from the host vehicle. The arbitrary point can be changed to a district town or a street address. The distance and the traveling time to the arbitrary point can be calculated based on the map information stored in the map information DB 41 and the congestion information around the host vehicle acquired via the communication network 3. After calculating the distance and the traveling time to an arbitrary point in this way, the processing in step S2 is completed and the display control processing proceeds to step S3.

In the processing in step S3, the control unit 48 first sends the sending request signal to the server 2 via the communication network 3. This sending request signal requests the server 2 to send the demand forecast information on the area within the predetermined-distance range including the host vehicle's current position and the arbitrary point. Next, in response to this sending request signal, the control unit 25 of the server 2 reads the demand forecast information on the area within the predetermined-distance range, including the host vehicle's current position and the arbitrary point, from the demand forecast information DB 22 for the period up to the predetermined time ahead from the current time. Next, the control unit 25 of the server 2 sends the demand forecast information for the period up to the predetermined time ahead from the current time, which has been has been read, to the vehicle 4 via the communication network 3. When the demand forecast information for the period up to the predetermined time ahead from the current time is received, the control unit 48 extracts demand forecast information at the arbitrary point from the received demand forecast information while taking into account the traveling time to the arbitrary point calculated in the processing in step S2. For example, when the traveling time to the arbitrary point is five minutes, the control unit 48 extracts the demand forecast information at the arbitrary point corresponding to the time that is five minutes ahead from the current time. After extracting the demand forecast information on the arbitrary point in this way, the processing in step S3 is completed and the display control processing proceeds to the processing in step S4.

In the processing in step S4, the control unit 48 reads the map information on the area including the host vehicle's current position and the arbitrary point from the map information DB 41 and displays the map information, which has been read, on the display unit 42 as the map screen. In addition, the control unit 48 superimposes the direction and the position of the host vehicle on the corresponding position on the map screen on the basis of the information acquired from the gyro sensor 44 and the position information acquisition unit 45. After that, the control unit 48 superimposes the demand forecast information at the arbitrary point on the corresponding position on the map screen. This demand forecast information is the information extracted in the processing in step S3 while taking into account the traveling time to the arbitrary point. The processing described above allows the driver to confirm the demand forecast information that is determined while taking into account the traveling time from the host vehicle's current position to the arbitrary point, making it possible to dispatch the vehicle more efficiently.

As shown in FIG. 5, the control unit 48 may freely set the radiuses (distances) of the concentric circles R1 and R2 centered at the host vehicle's current position, calculate the traveling time of the host vehicle from the host vehicle's current position for each of the radius sizes that are set, extract demand forecast information corresponding to the time after the elapse of the traveling time, and display the extracted demand forecast information in the area of each concentric circle. The concentric circles R1 and R2 may be displayed on the display unit 42. In the example shown in FIG. 5, the radiuses of the concentric circle R1 and concentric circle R2 are set to 5 km and 10 km, respectively, and the traveling times from the current position of the vehicle 4 to the area in the range within 5 km and 10 km are calculated as 5 minutes and 30 minutes, respectively. Therefore, the control unit 48 displays the demand forecast information corresponding to the time that is five minutes ahead from the current time in the range of the concentric circle R1, and the demand forecast information corresponding to the time that is 30 minutes ahead from the current time in the range of the concentric circle R2 excluding the range of the concentric circle R1. That is, when the radius of the concentric circle R2 is larger than that of the concentric circle R1, the first demand forecast information is displayed in the range of the concentric circle R1, and the second demand forecast information in the range of the concentric circle R2 excluding the range of the concentric circle R1. Note that only one circle may be set instead of concentric circles or three or more concentric circles may be set.

As shown in FIG. 6, the control unit 48 may preferably display an enlargement/reduction icon 51 for enlarging/reducing the map screen on the display unit 42. This allows the driver to operate an operation button 52 of the enlargement/reduction icon 51 via the operation input unit 43 to give an instruction to enlarge/reduce the map screen. The control unit 48 changes the display range of the demand forecast information according to the enlargement ratio and the reduction ratio specified by the driver and superimposes the display range on the map screen according to this ratio. On the map screen shown in FIG. 6, the vehicle icon PA, which indicates the direction and position of the host vehicle, and the demand forecast icons PB1 to PB3, each of which indicates the required number of vehicles 4 at each address, are displayed.

In addition, as shown in FIG. 6, the control unit 48 may preferably display a time setting icon 53, which is used for setting the time of demand forecasting, on the display unit 42. This allows the driver to operate the time setting icon 53 via the operation input unit 43 to display the demand forecast information at an arbitrary time. From the demand forecast information for the period up to a predetermined time that has been acquired from the server 2, the control unit 48 extracts the demand forecast information at a driver-specified arbitrary time. Then, the control unit 48 superimposes the extracted demand forecast information on the map screen. The control unit 48 may also acquire the data (vehicle dispatch history information) on the past vehicle dispatch results (last year/last month/last week/same day/same time, etc.) from the server 2 according to a driver's operation and display the acquired data. After the information described above is displayed in this way, the processing in step S4 is completed and a series of display control processing is terminated.

Although the embodiment has been described above, further effects and modifications can be easily derived by those skilled in the art. A broader aspect of the present disclosure is not limited to the specific details and representative embodiments shown and described above. Accordingly, various changes may be made without departing from the spirit or the scope of the general inventive concept as defined by the appended claims and their equivalents.

What is claimed is:

1. A display control method comprising
forecasting, by a display control device, a demand for a vehicle dispatch at an arbitrary point or in an arbitrary area at a time specified by a host vehicle, the time being a time at which the host vehicle will arrive at the arbitrary point or in the arbitrary area from a current position of the host vehicle, the arbitrary area being an area included in one of a plurality of concentric circles centered at a current position of the host vehicle, the forecasting the demand for the vehicle dispatch including:
calculating, by the display control device, first demand forecast information based on a size of a first radius of a first concentric circle included in the plurality of concentric circles, and
calculating, by the display control device, second demand forecast information based on a size of a second radius of a second concentric circle included in the plurality of concentric circles, the second radius being larger than the first radius; and
superimposing, by the display control device at a position on a map screen, information about the forecasted demand, the position corresponding to the arbitrary point or—the arbitrary area at the time specified by the host vehicle, the superimposing including:
superimposing, by the display control device on the map screen, the first demand forecast information in a range of a first display area corresponding to the first concentric circle, and
superimposing, simultaneously with the first demand forecast by the display control device on the map screen, the second demand forecast information in a range of a second display area corresponding to the second concentric circle excluding the range of the first display area.

2. A display control device comprising:
a memory; and
a processor with hardware, the processor being configured to:
forecast a demand for a vehicle dispatch at an arbitrary point or in an arbitrary area at a time specified by a host vehicle, the time being a time at which the host vehicle will arrive at the arbitrary point or in the arbitrary area from a current position of the host vehicle, the arbitrary area being an area included in one of a plurality of concentric circles centered at a current position of the host vehicle, the forecast of the demand including the processor being further configured to:
calculate first demand forecast information based on a size of a first radius of a first concentric circle included in the plurality of concentric circles, and
calculate second demand forecast information based on a size of a second radius of a second concentric circle included in the plurality of concentric circles, the second radius being larger than the first radius, and
superimpose, at a position on a map screen, information about the forecasted demand, the position corresponding to the arbitrary point or the arbitrary area at the time specified by the host vehicle, the superimposition of the information about the forecasted demand including the processor being further configured to:
    superimpose the first demand forecast information in a range of a first display area corresponding to the first concentric circle, and
    superimpose, simultaneously with the first demand forecast, the second demand forecast information in a range of a second display area corresponding to the second concentric circle excluding the range of the first display area.

3. A non-transitory recording medium storing a display control program, the display control program being configured to cause a display control device to perform a method comprising:
    forecasting a demand for a vehicle dispatch at an arbitrary point or in an arbitrary area at a time specified by a host vehicle, the time being a time at which the host vehicle will arrive at the arbitrary point or in the arbitrary area from a current position of the host vehicle, the arbitrary area being an area included in one of a plurality of concentric circles centered at a current position of the host vehicle, the forecasting including:
        calculating first demand forecast information based on a size of a first radius of a first concentric circle included in the plurality of concentric circles, and
        calculating second demand forecast information based on a size of a second radius of a second concentric circle included in the plurality of concentric circles, the second radius being larger than the first radius; and
    superimposing, at a position on a map screen, information about the forecasted demand, the position corresponding to the arbitrary point or the arbitrary area at the time specified by the host vehicle, the superimposing including:
        superimposing the first demand forecast information in a range of a first display area corresponding to the first concentric circle, and
        superimposing the second demand forecast information in a range of a second display area corresponding to the second concentric circle excluding the range of the first display area.

4. A display control system comprising:
    a processor configured to:
        receive a specification of an arbitrary point from an occupant of a vehicle,
        acquire position information including a current position of the vehicle,
        calculate a distance and a traveling time from the current position of the vehicle to the arbitrary point based on the position information,
        send a sending request signal to a server outside the vehicle via a communication network, the sending request signal requesting the server to send demand forecast information on an area within a predetermined-distance range including the current position of the vehicle and the arbitrary point, the demand forecast information corresponding to a demand for vehicle dispatch,
        receive, from the server, the demand forecast information for a period up to a predetermined time from a current time, and
        extract, based on the calculated traveling time, specific demand forecast information on the arbitrary point,
        set a first concentric circle and a second concentric circle both of which are centered at the current position of the vehicle,
        calculate, based on the specific demand forecast information, first demand forecast information based on a size of a first radius of the first concentric circle, and
        calculate, based on the specific demand forecast information, second demand forecast information based on a size of a second radius of the second concentric circle, the second radius being larger than the first radius; and
    a display configured to superimpose, on a map screen, the specific demand forecast information on the arbitrary point, the superimposition of the specific demand forecast information including the display being configured to:
        superimpose, on the map screen, the first demand forecast information in a range of a first display area corresponding to the first concentric circle, and
        superimpose, simultaneously with the first demand forecast information on the map screen, the second demand forecast information in a range of a second display area corresponding to the second concentric circle excluding the range of the first display area.

* * * * *